United States Patent [19]

Baumann et al.

[11] 4,006,342

[45] Feb. 1, 1977

[54] CONTROL APPARATUS FOR DETERMINING USAGE TIME

[75] Inventors: Alexander Baumann, Velbert; Ulrich Juesten, Heiligenhaus; Dieter Hannemann, Bochum, all of Germany

[73] Assignee: Schulte-Schlagbaum Aktiengesellschaft, Tonisheide, Germany

[22] Filed: Sept. 17, 1974

[21] Appl. No.: 506,893

[30] Foreign Application Priority Data

Sept. 17, 1973 Germany .......................... 2346728
May 24, 1974 Germany .......................... 2425143

[52] U.S. Cl. .............. 235/61.11 D; 235/61.12 M; 194/4 F

[51] Int. Cl.² .................. G06K 7/08; G06K 19/06; G07F 1/06

[58] Field of Search ............. 235/61.12 M, 61.7 B, 235/61.8 A, 61.11 D, 93; 194/4 R, 4 F, 4 G, DIG. 24; 360/97, 135; 340/51; 232/61

[56] References Cited

UNITED STATES PATENTS

| | | | |
|---|---|---|---|
| 3,287,543 | 11/1966 | Halpern | 235/61.8 A |
| 3,356,021 | 12/1967 | May et al. | 235/61.8 A |
| 3,452,358 | 6/1969 | Zehner | 235/61.12 M |
| 3,755,652 | 8/1973 | Endo et al. | 235/61.12 M |
| 3,788,617 | 1/1974 | Barney | 235/61.12 M |

*Primary Examiner*—Daryl W. Cook
*Attorney, Agent, or Firm*—Ernest G. Montague; Karl F. Ross; Herbert Dubno

[57] ABSTRACT

A control apparatus for measuring usage time including an information carrier in the form of a token having magnetizable regions; the latter store information consisting of individual magnetic signals upon insertion of a coin corresponding to the time thereof. The token is interrogated in a read device upon its insertion therein.

7 Claims, 9 Drawing Figures

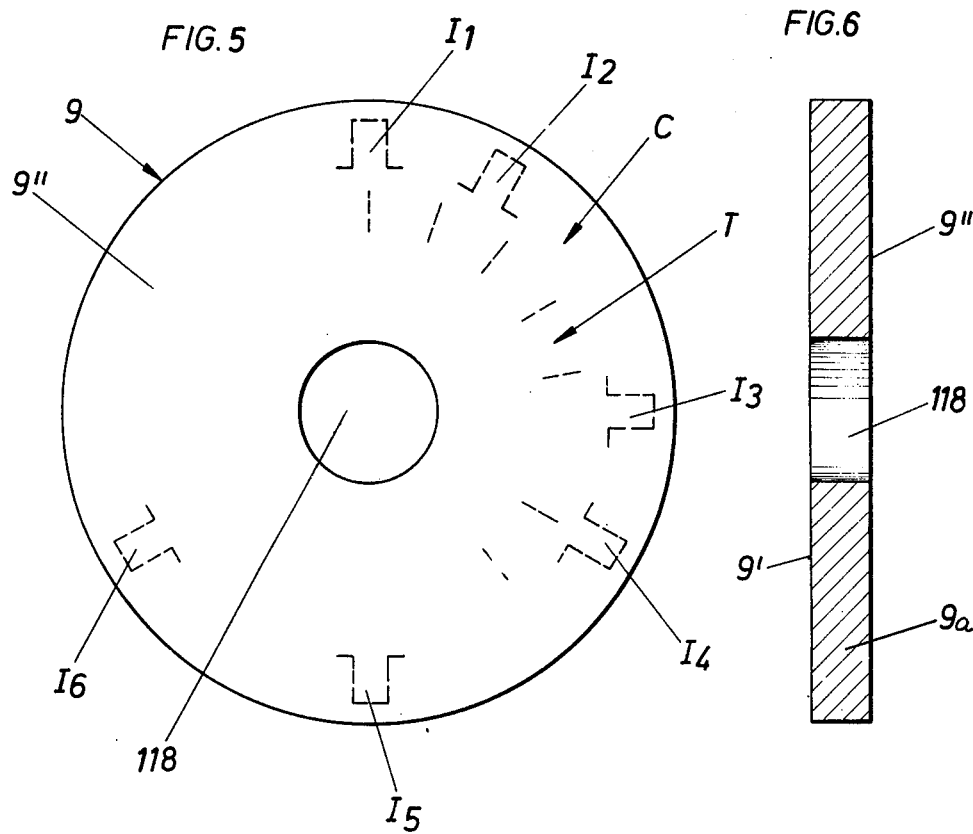
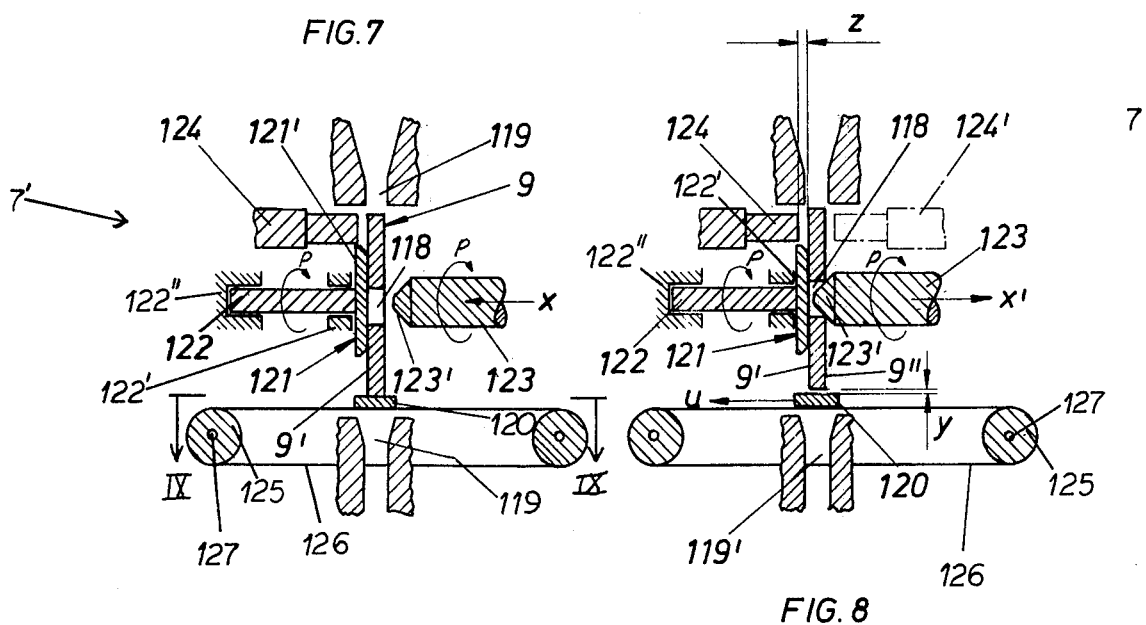

CONTROL APPARATUS FOR DETERMINING USAGE TIME

FIELD OF THE INVENTION

The invention relates to a control apparatus for measuring usage time using a token with magnetizable regions as an information carrier.

BACKGROUND OF THE INVENTION

A usage-time control-apparatus is known, which uses a read-out device and an information carrier to determine the residence-time of a visitor in an installation by measuring the time difference between entry and exit of the visitor. The exit from the installation, normally closed, is openable in dependence on the time difference determined. Additionally a "money-return" device can be coupled to the time-difference measuring device by means of which, depending on the usage time of the installation, the unused remainder of the fee deposited on entry to the installation is refunded to the user. It is equally possible to couple an indication requesting additional money or fees to the time-difference measuring device. It has been proposed that the magnetizable data carrier be designed so as to yield magnetic information signals readable as distinct audio frequencies. Upon return of the information carrier the audio frequency read from the information carrier is compared with the audio frequency currently provided by the coding unit. An implementation of this type is disadvantageous, for the information carrier must traverse the read-out means with a constant velocity. If the velocity is altered, the result is an erroneous reading of the impressed audio frequency. Also if two magnetic regions are not equidistant and a constant coding or reading velocity is employed this will result in a change which may lead to errors or disturbances in the control apparatus. On one hand one is faced with a very sensitive and costly installation, and on the other hand this solution requires the insertion of an information carrier in a certain position. Also this type of information carrier, which has the form of a punched card, is not suitable for certain installations, such as a bathing establishment.

OBJECT OF THE INVENTION

It is therefore an object of our invention to design a generic control apparatus determining usage time obviating the aforesaid disadvantages, and where a suitable form of the information carrier will lead to a simplified, less error-prone and more easily usable installation.

SUMMARY OF THE INVENTION

A control apparatus, including an information carrier, in the form of a token with a plurality of magnetically polarizable regions determines the usage time of an installation by having information written thereon upon insertion of a coin corresponding to the time thereof, while a read-out device interrogates these magnetic regions upon insertion of the token into the apparatus. The flat token having two sides is provided with side-identification and zeroing means, the number and position of the polarizable regions located at right angles to the sides of the token being used for impressing information thereon.

All tokens may have the same geometrical shape, preferably circular, which makes for ease of manufacture and also facilitates circulation of the token within the installation. As a result of the magnetizable regions extending between the two broad sides of the coin polarizable by the coding unit the reading means need only interrogate for a "yes" or "no" reply. Coding and sensing of the token within the reading means can accomplished with the token being stationary, each region being successively scanned step by step. Zeroing of the token permits reading to be commenced always at the same magnetizable region. Side-identification of the token avoids an erroneous reading, so that it is immaterial how the token is inserted. If required, the side-identification device switches the reading means to mirror-reversed scanning, i.e. interrogation is accomplished in the opposite rotation direction and with opposite polarities of the magnetizable regions. The latter, used for the storage of information can, for example, be solid magnetizable cores which are inserted into an appropriate non-magnetic material, such as synthetic plastic. Such solid cores permit the storage of a sufficiently large field strength, so that it is possible, if necessary, to obtain a larger number of coding permutations by additionally making use of the magnitude of the polarization. The token may also consist of a disk having partial regions of magnetizable material.

It has been found to be advantageous to affect zeroing during reading by optical means; providing the token with an opening for this purpose does not in any way effect the surface of the coin disadvantageously so that circulation of the token through the coding unit and handling thereof by the reading means is not impaired.

Side-identification of the token is accomplished by magnetic means. An auxiliary magnet disposed between the broad sides of the token, but outside the scanning path of the time-coding magnets serves for this purpose; the former is always polarized in the same sense by the coding unit. If the token is inserted into the reading means in a reverse direction, the add-on magnet causes a reversal of the reading process. It is alternately possible to dispose this auxiliary magnet within the scanning path of the time-coding magnets.

The coding unit should then polarize all magnets, of which there is an odd number so that the addition of all equally polarized magnets, including the add-on magnet, results in either an odd or an even number. The reading means should then be appropriately constructed to permit that addition; at the appropriate insertion of the token a direct evaluation occurs, otherwise the evaluation is performed in a mirror-like fashion. During the reading process both the sum of the coded information, as well as its mirror image will be recognized as valid and a closed exit will consequently be opened. It is also possible for example to automatically request additional payment when the time of usage is exceeded. To increase the stored information several concentrically located scanning paths can be used, the size of the token remaining constant. If coding and interrogation is to be accomplished with a rotating instead of a stationary token, then a rotation of the token without any contact with a magnetic head provides the best solution according to the invention.

As the information carrier is in the form of a token it can be easily and inexpensively manufactured, and its circulation through the bathing establishment is facilitated. The fact that the information carrier is a token permits its use for additional functions in the control apparatus for determining usage time, for example to open a lock, obtained, for example, against a deposit, of a storage drawer or the like.

Since the information carrier can rotate without making contact with the magnetic head during the write-in or reading mode of the apparatus, a commercially available magnetic head can be used. It has been found that 1500 revolutions per minute are suitable for a token diameter of about 26 mm. Hence the commercially available magnetic head for audio frequencies can be used and operated at a higher than normal rating, since coding or reading takes only a small fraction of a second. Inspite of an airgap of about 0.2 mm between the token and the magnetic head a differentiable magnetization of the coin can be obtained, using a rectangular writing impulse of about 500 Hz. The aforesaid airgap of 0.2 mm also is associated with a low stray magnetic field which facilitates the reading process. Magnetization of the token-shaped information carrier is such that the reading station is only required to interrogate for a yes or no answer. The magnetic head for audio frequencies can be disposed at the reading station at a distance of up to 0.5 mm from the surface of the token, since the relatively high number of revolutions per second of the token results in an increased energy transfer permitting more accurate reading. Since the token rotates without contacting the magnetic head, the latter is not subjected to any frictional wear. Addition storage of information can be accomplished if a higher density is used.

The token itself may consist of magnetizable material; it is, however, also possible to fabricate the token of non-magnetizable material and to provide the broad sides of the token with magnetizable ribbons, such as magnetic audio-frequency ribbons.

Upon insertion of the token the latter immediately reaches a support which maintains the token in a central position between an abutment for the token and a plunger. The token is formed with an opening to receive a conical end of the plunger, so that a displacement of the plunger towards the token causes the latter to be both centered and rotated. The above-mentioned parts are simple in construction and not subject to disturbance- or error-prone. By centering the token the latter is also lifted slightly from its support, the token therefore not being subjected to any friction as a result of its rotation and no change of velocity taking place which might lead to an erroneous reading.

A two-track magnetic head permits the writing-in of more than one track into the token. An inner track serves as a timing track, whereby an impermissible manipulation of the token — for example by means of a magnet — is detectable. An information-free angular interval within the region of the timing track serves to identify the start of that track, so that reading can always be commenced at the appropriate starting information.

Two juxtaposed magnetic heads in the reading station permit the token to be placed into a token-insertion slot of the reading station in an arbitrary position, the corresponding magnetic head in juxtaposition with the magnetized broad side of the token then taking over the reading function.

BRIEF DESCRIPTION OF THE DRAWING

These and other objects of our invention will be better understood with reference to the accompanying drawing in which:

FIG. 5 shows the information carrier in the form of a token corresponding to the representation shown in FIG. 4;

FIG. 6 is a cross-section of the token illustrated in FIG. 5;

FIG. 7 is a cross-section through the coding station upon insertion of the token and prior to the action of a laterally acting plunger;

FIG. 8 corresponds to FIG. 7 subsequent to the action of the laterally acting plunger.

SPECIFIC DESCRIPTION

Figure 1:
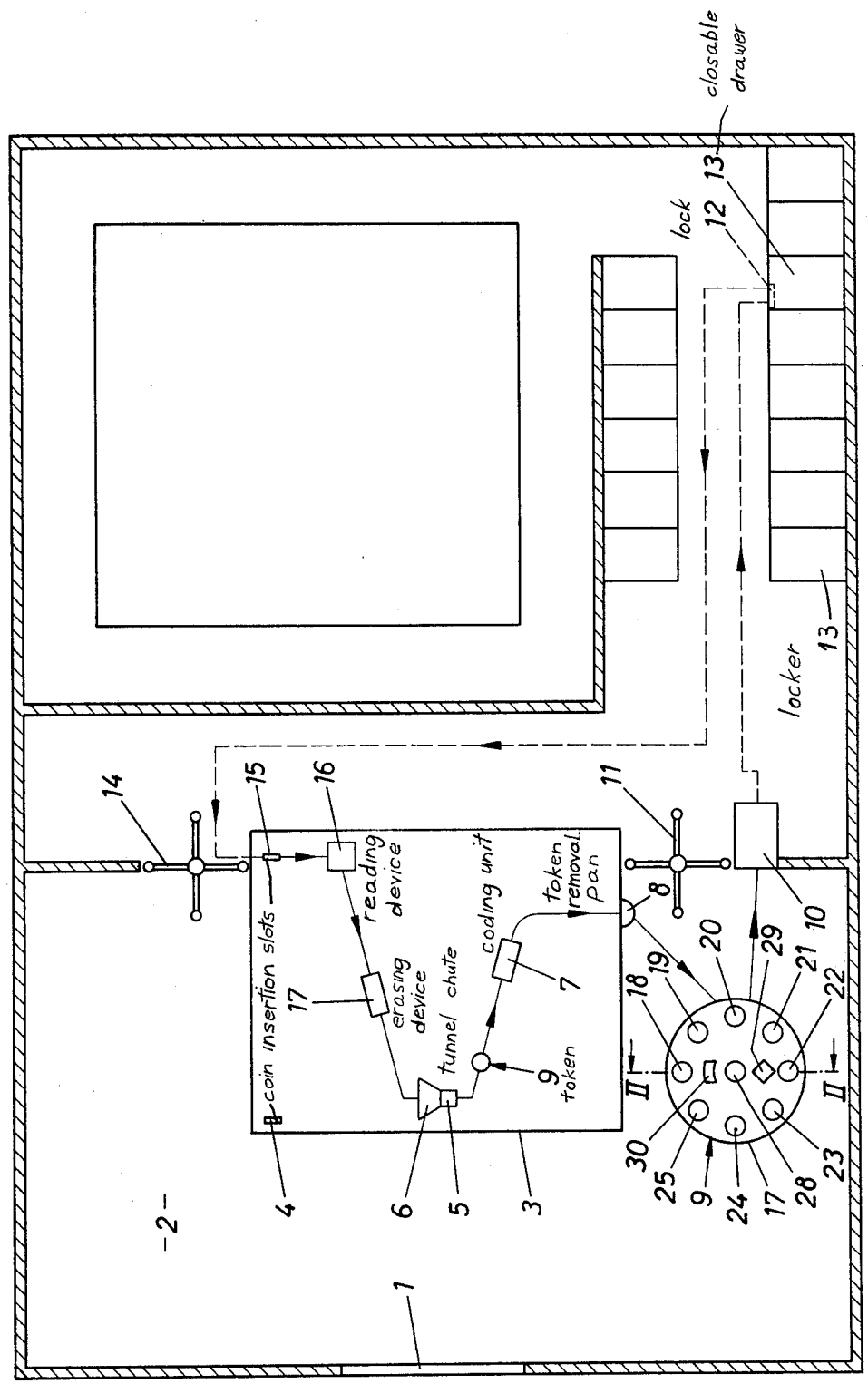
FIG. 1 is a schematic representation of the control apparatus for determining usage time in a bathing establishment.

In a first version of the invention a bathing establishment has a prime entrance 1 which leads to an anteroom 2, containing a control apparatus for determining usage time in a common closed housing 3, which is formed with a slot 4 for insertion of coins. Additional slots 4 can be provided for insertion of coins of different denominations.

A coin chute 5 is provided in housing 3, which widens into a funnel 6. A coding unit 7 and a removal pan 8 is associated with coin chute 5.

Upon insertion of a coin a token 9 is made to pass through a chute 5 and traverses a coding unit 7, coming to rest in a removal pan 8. Token 9 is then made to pass through an automatic entry-closure device 10, which in turn permits a turnstile 11 to advance one step. Within the bathing establishment a lock 12, of a closable drawer 13 of a locker 13' — obtained, for example, together with the lock's key by the user against a deposit— can be opened, and this is accomplished in a known fashion by inserting token 9 into lock 12, which is then closable; the key for lock 12 not shown in the drawing is removable, while token 9 remains in lock 12 as a deposit for the key. Upon opening of lock 12 token 9 is returned. Upon leaving the bathing establishment the user must pass a turnstile 14. Adjoining turnstile 14 housing 3 is formed with a coin opening 15. Upon insertion of token 9 into the former, the token passes through a reading device 16 and an erasing device 17, whereupon it falls into a funnel 6. Erasing device 17 can also be omitted, if the coding, to be explained later, is performed by way of re-magnetization.

Token 9 is a round disk made of non-magnetic material acting as a holder for selectively magnetizable substances. As best seen from FIGS. 1 and 2, token 9 is provided with magnetically polarizable regions equidistantly distributed from each other, located concentrically with respect to its rim 17' and transversely to broad side B of token 9. These regions are constituted by time-coding magnets 18 through 25, and are formed by solid cores having a circular cross-section fitting into corresponding openings 26 of token 9.

A similarly polarizable core 28 is provided in the center of token 9, serving to classify the token, e.g.

either for a male or female adult or for a male or female child.

An auxiliary magnet 29 is disposed between core 28 and time-coding magnets 22. The former is quadratic in cross-section in the example shown, but could have any other cross-section, and serves to mark token 9 laterally.

A recess extending between time-coding magnet 18 and core 28 serves to zero token 9.

All magnetic regions are polarized in coding unit 7 so that auxiliary magnet 29 of all tokens 9 is always polarized, in the same direction, i.e. the North and South-poles always lie on the respective same sides of the token. A recess 30 of token 9 serving to zero the latter is traversed by a light ray when the token rests in reading device 16, the read-out process thus being reset to zero; the side-identification obtained by auxiliary magnet 29 provides reading device 16 with the proper impulse for a correct read-out. If token 9 is for example inserted into a reverse position with respect to the proper coding position, auxiliary magnet 29 arranges the read-out so that interrogation takes place with the token rotating in reverse, the direction of polarization, being reversed also.

Figure 3:
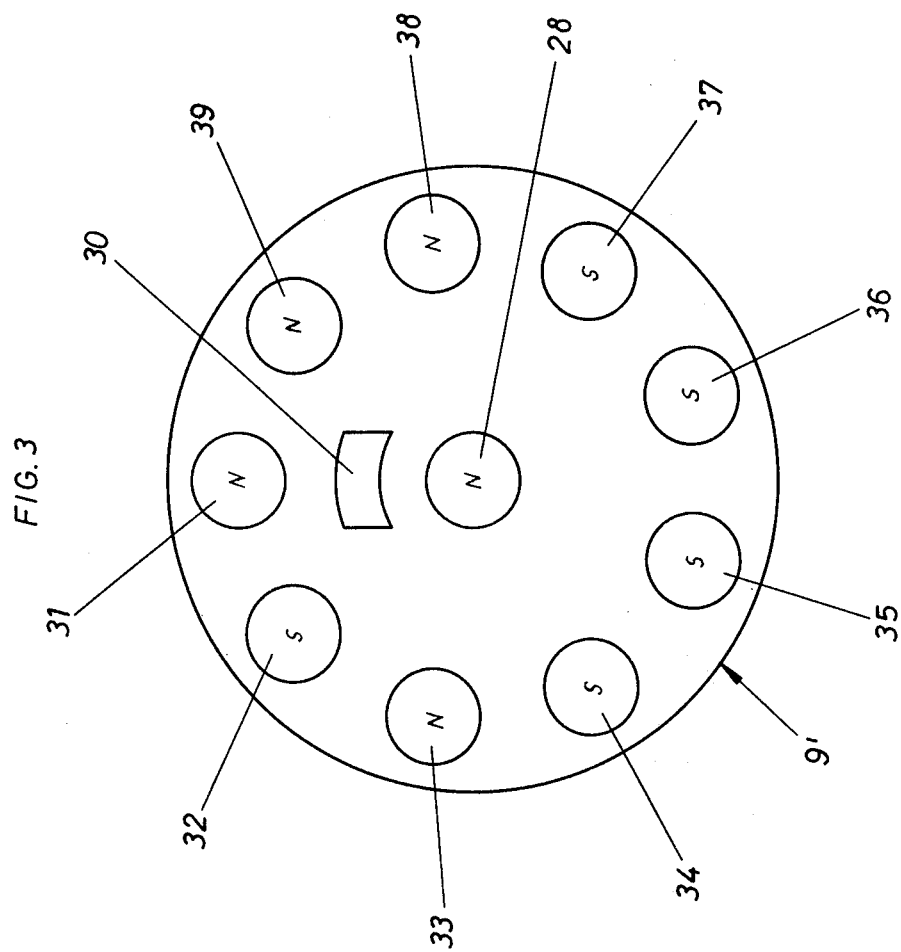
FIG. 3 shows a second version of the token according to our invention.
Figure 2:
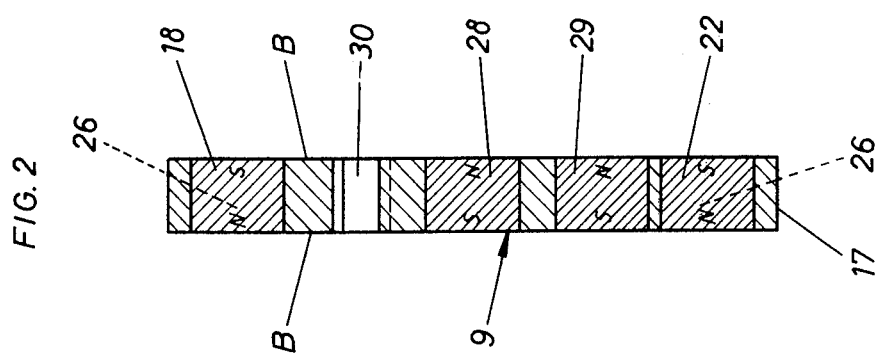
FIG. 2 shows an enlarged cross-section as viewed along line II—II of FIG. 1.
Figure 4:
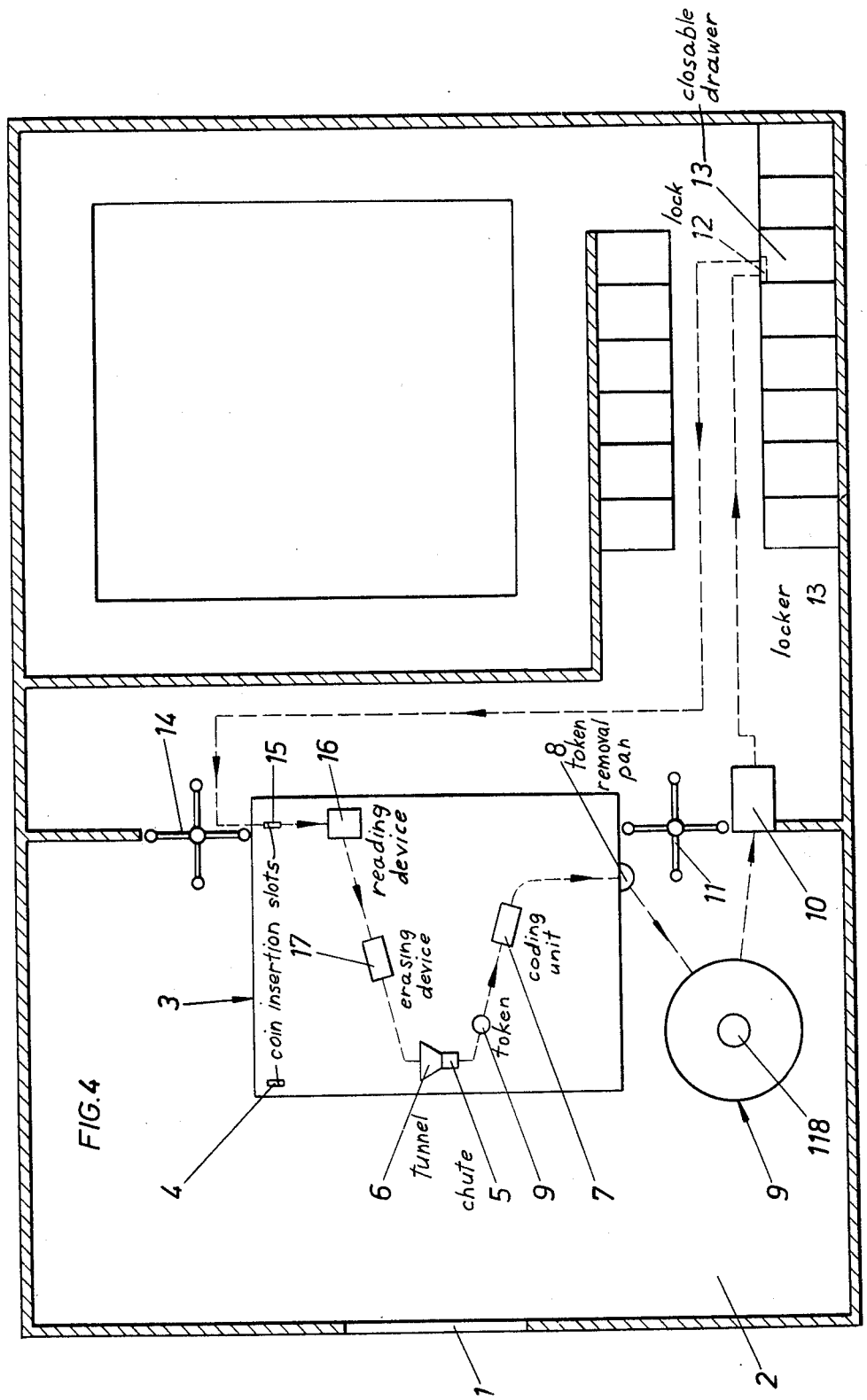
FIG. 4 is a schematic representation of the control apparatus for determining usage time in a bathing establishment according to a third version of our invention.
Figure 9:
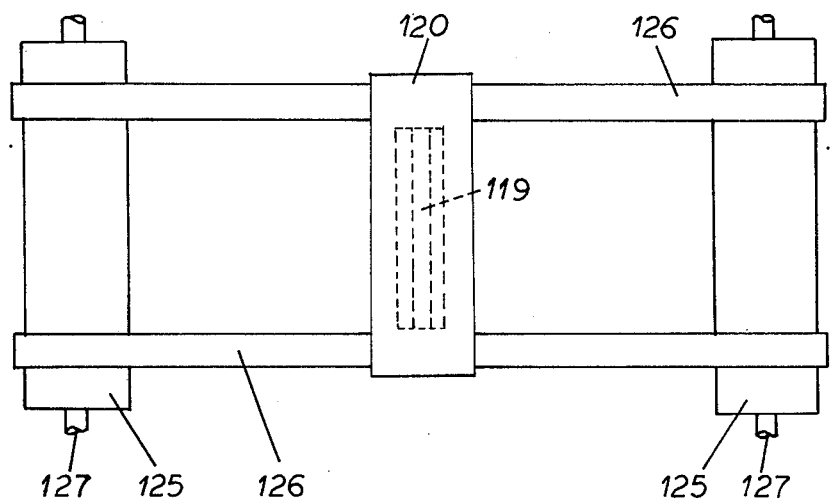
FIG. 9 is a cross-section along line IX—IX of FIG. 7.

In the version of our invention shown in FIG. 3 time-coding magnets 31 through 38 are located on the same scanning path as an auxiliary magnet 39, but otherwise version 9' of the token is similar to that illustrated in FIGS. 1 and 2.

In that version token 9' is polarized in coding unit 7 in such a way that auxiliary magnet 38 is always polarized for the addition of its north pole with the north poles of the time-coding magnets on the same side of the token to yield an even number. If this is not the case, however, the read-out process is performed and evaluated along the mirror image of the magnets contained in token 9'. Alternately, side-identification can also be accomplished mechanically.

According to this second version of the invention the bathing establishment is again provided with a main entrance 1 and an adjoining anteroom 2, and also uses a common housing 3, having one or more coin-insertion slots 4 for use of coins of a single or multiple denominations respectively.

A token 9 as shown in FIG. 5 is a circularly shaped disk of magnetizable material formed with a central opening 118. Coding unit 7' and read-out station 16' are substantially identical in construction with that of the respective coding unit 7 and read-out station 16 described earlier.

Coding unit 7' illustrated in FIG. 7 and 8 is formed with an insertion slot 119, which is widening conically upwards. Below this insertion slot 119 there extends a laterally slidable support 120 for token 9a lying in the trajectory of the latter, token 9a abutting support 120. One broad face 9' of token 9a then faces a rotatable token abutment 121, the latter being rotated by a drive not shown in the drawing in the direction of an arrow p. Abutment 121 consists of a disk 121' and of an axle 122 located in bearings 122' and 122''. Axle 122, being supported by bearings 122' is additionally prevented from moving to the left by bearings 122'' as seen in FIGS. 7 and 8. A slideable plunger 123 extends in coaxial juxtaposition to abutment 121, has a conically narrowing end 123' facing abutment 121, and rotates in the same direction and at the same number of revolutions as axle 122.

Upon coin 9a having entered the position shown in FIG. 7 plunger 123 moves in the direction of arrow x, thereby centering token 9a and simultaneously pressing the same against abutment 121. Since the distance from the upper surface of support 120 to the axis of plunger 123 is greater than the radius of token 9a the latter is lifted by an amount y — see FIG. 8 thereby being completely free, token 9a being thus held by plunger 123 is then made to rotate. During this rotation a two-track magnetic head 124 facing the broad side 9' of token 9a generates a coding track C with informations $I_1$ through $I_6$ written thereon in the form of magnetic fields. Two-track magnetic head 124 simultaneously generates an inner track T being concentric with the axis of token 9a. As can be seen from FIG. 5, track T occupies only part of a circular track on broad side 9' of token 9a, an information-free angular interval remaining on that side.

Upon the appropriate digital signals being written into token 9a by coding unit 7', support 120 is moved laterally in the direction of arrow u by means of, for example, belts 126 moved by rollers 125, the reversible drive for rollers 125 being coupled, for example, to one of shafts 127, the drive not being shown in the drawing. Upon displacement of plunger 123 in the direction x' token 9a falls into a pre-aligned token reception slot 119'.

The difference between reading unit 16' and coding unit 7' consists in airgap z of coding unit 7' formed between magnetic head 124 and broad side 9' of token 9a being somewhat narrower. Furthermore, since token 9a can also be received by reading unit 16' in a reverse position, an additional two-track magnetic head 124' is placed in juxtaposition with magnetic head 124 in reading unit 16' and shown in dot-dash lines for clarity's sake in FIG. 8. The former is arranged so that the signals which it sees in a mirror image are reversed by changing the direction of rotation p, magnetic head 124' also seeing a reversed polarity of information $I_1$ through $I_6$.

We claim:

1. A control apparatus comprising an information carrier and coding and read-out means for said information carrier, said means comprising a magnetic head, said information carrier being a token having two broad sides and in contactless juxtaposition with said magnetic head rotating about an axis transverse to said broad sides, said apparatus being additionally formed with an insertion slot for causing said token to fall along a predetermined trajectory and further comprising:
   a support for said token normally in the path of said trajectory and steerable out of said path, said token being formed with a central opening;
   a rotatable token abutment disposed beyond said slot; and
   a plunger having a cone-shaped end slidable towards said token abutment, said opening being penetrable by said cone-shaped end.

2. A control apparatus as defined in claim 1 wherein said token is liftable by said cone-shaped end upon penetration of said slot.

3. A control apparatus as defined in claim 1 further comprising a first two-track magnetic head, said token being codable by said magnetic head by information generated therefrom on inner and outer tracks.

4. A control apparatus as defined in claim 3 wherein said inner track is a timing track and said outer track a coding track.

5. A control apparatus as defined in claim 3 wherein said inner track includes an information-free angular interval.

6. A control apparatus as defined in claim 1 wherein said readout means further comprises a second two-track magnetic head, each of said magnetic heads being disposed to sense a respective broad side of said token.

7. An apparatus for controlling usage time, comprising:
   a housing;
   magnetic recording means in said housing for imparting information to magnetically sensitive material;
   an information-carrying token in the form of a disk provided with a circular array of regions of said material juxtaposable with said recording means for recording information on said token;
   mechanism in said housing for positioning said token in juxtaposition with said recording means and for thereafter dispensing the token;
   a magnetic readout means in said housing responsive to information recorded on said token; and
   a further mechanism in said housing for positioning a token introduced into said housing in juxtaposition with said readout means, said token being formed with a light-transmissive window and at least one of said mechanisms being provided with a light beam adapted to traverse said token.

* * * * *